United States Patent Office 3,089,911
Patented May 14, 1963

3,089,911
HALOGENATED ORGANIC COMPOUNDS
Murray Hauptschein, Glenside, and Milton Braid, Philadelphia, Pa., assignors to Pennsalt Chemicals Corporation, Philadelphia, Pa., a corporation of Pennsylvania
No Drawing. Filed Feb. 26, 1959, Ser. No. 795,585
2 Claims. (Cl. 260—653.8)

This invention relates to low polymers (usually referred to as telomers) based upon the olefin, vinylidene fluoride.

Telomers of haloolefins, particularly those containing a high proportion of fluorine, which are liquids at normal or slightly greater than normal temperatures, are useful as lubricants, hydraulic fluids, damping fluids, and the like, in many applications where relatively good thermal stability and high chemical stability is required. In contrast to hydrocarbon oils, liquid oils prepared from such haloolefins, for example, from chlorotrifluoroethylene, are non-flammable and chemically inert, such that they can be employed in applications involving exposure to reactive chemicals which would cause hydrocarbon oils to degrade rapidly.

One of the major disadvantages of commercially available telomer oils containing high proportions of fluorine is that they tend to undergo marked changes in viscosity with change in temperature. This is true, for example, of commercially available telomer oils prepared from the olefin, chlorotrifluoroethylene, which undergo considerably larger changes in viscosity with temperature than hydrocarbon oils of corresponding viscosity. Such a high rate of viscosity change with temperature is a distinct disadvantage in many applications. For example, an excessive decrease in viscosity will seriously diminish the lubricant properties of an oil or its usefulness as a hydraulic fluid.

We have previously discovered that it is possible to prepare open-chain telomers containing vinylidene fluoride ($CH_2CF_2$) units providing relatively heavy oils liquid at or close to room temperature which display markedly improved viscosity-temperature characteristics over previously available fluorinated telomer oils. In this previous work, we have found that in order to prepare such vinylidene fluoride-based oils, special techniques are required because of the apparent tendency of the repeating vinylidene fluoride units in the telomer chain to cause the telomers to undergo a rapid transition from relatively light, mobile liquids to crystalline-like solids rather than forming a series of liquids of gradually increasing viscosity. One technique for over-coming this difficulty is described in our copending application Serial No. 773,551 filed November 13, 1958, and now U.S. Patent No. 2,975,220, in accordance with which it has been found that when at least one end of the telomer chain containing the repeating ($CH_2CF_2$) units is provided with a halogenated radical having at least three carbon atoms, it is possible to obtain relatively viscous oils of good viscosity temperature characteristics.

Another technique for overcoming the tendency for vinylidene fluoride-containing telomers to undergo abrupt transition from light liquids to solids is described in our copending application Serial No. 776,432, filed November 26, 1958. In accordance with this latter application, it has been found that cotelomers of vinylidene fluoride, in which olefin units from other haloolefins are introduced into the cotelomer chain in minor controlled amounts, likewise provide oils of good lubricant viscosity and good viscosity-temperature characteristics.

In accordance with the present invention, still another technique has been discovered for obtaining vinylidene fluoride based telomers which are relatively viscous liquids at or close to normal temperatures, and thus useful as lubricants and the like, which have high chemical stability, and which at the same time have viscosity-temperature characteristics that may be as good as or in some cases even superior to conventional hydrocarbon lubricant oils. It has been found that this may be accomplished by replacing a minor, controlled proportion of the hydrogen atoms of the vinylidene fluoride ($CH_2CF_2$) units in the telomer chain with chlorine atoms. Although the invention does not depend upon any particular theory, it is believed that the substitution of a minor porportion of hydrogen atoms by chlorine (which are sterically bulky in contrast to hydrogen atoms) tends to hinder sterically the vinylidene fluoride units in the telomer chain from orienting with one another in crystalline-like arrangements. Such orientation is believed responsible for the tendency of vinylidene fluoride-containing telomers to undergo abrupt transition from relatively light liquids to solids. In general, the invention is applicable to open chain telomers the chain portion of which consists predominantly of vinylidene fluoride ($CH_2CF_2$) units. This includes vinylidene fluoride homotelomers, that is, telomers of which the chain portion contains vinylidene fluoride units exclusively, and also includes cotelomers in which the telomer chain contains other olefin units, (e.g. ($CF_2CFCl$) units derived from chlorotrifluoroethylene) and in which the molar ratio of vinylidene fluoride units to units derived from the other olefin predominates, this ratio being preferably greater than 3:1.

The invention does not depend on the way the starting telomers are prepared. Any suitable telomerization procedure may be employed involving reaction of a free-radical-forming telogen AB with vinylidene fluoride alone, or with vinylidene fluoride mixed with another olefin, to form homotelomers of the formula $A(CH_2CF_2)_nB$ or cotelomers of the formula $A(Z)_m(CH_2CF_2)_nB$ where A and B are end groups derived from the telogen AB; where $n$ and $m$ are integers indicating the number of repeating olefin units linked together end to end in a chain; and where Z is an ethylenic divalent radical derived from an olefin other than $CH_2=CF_2$ which condenses in the telomer chain at the double bond.

A highly preferred procedure for preparing vinylidene fluoride telomers involves the use of halogenated iodides as telogens, particularly halogenated alkyl iodides such as $CF_3I$, $CF_2ClCFCll$, $CF_2ClCF_2I$ etc. Homotelomers such as $CF_3(CH_2CF_2)_nI$ may be formed by reaction of such telogens at 180 to 220° C. and 100 to 10,000 lbs./in.² with $CH_2=CF_2$. Cotelomers such as

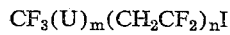

$$CF_3(U)_m(CH_2CF_2)_nI$$

may be formed by reaction of such telogens with a mixture of $CH_2=CF_2$ and another olefin under similar conditions. The preparation of vinylidene fluoride homotelomers and cotelomers using iodide telogens is described in our copending applications 773,551 and 776,432. As also described in these prior applications, the telomer iodides may be treated after preparation to replace the terminal iodine atom by other halogen atoms. While the use of halogenated iodide telogens represents the preferred method for preparing the vinylidene fluoride telomers, if desired, other telogens may be employed.

In the practice of the invention it is preferred to employ telomers prepared from telogens which provide end groups A and B selected from the class consisting of halogen, and halogenated organic radicals having from 1 to 6 carbon atoms, particularly halogenated alkyl radicals having from 1 to 6 carbon atoms. A highly preferred class of telomers for treatment in accordance with the invention are those in which one end group is halogen, and the other is a halogenated alkyl radical having from 1 to 6 carbon atoms. End groups consisting of halogens or halogenated organic radicals are preferred because of the properties of non-flammability and chemical stability, particularly when the halogens involved are chlorine and fluorine, which they impart to the telomer.

The preferred cotelomers for treatment in accordance with the invention are those in which the other olefin which is cotelomerized with vinylidene fluoride is a halogenated monoolefin having from 2 to 10 and preferably from 2 to 4 carbon atoms, particularly those containing only elements selected from the class consisting of carbon, hydrogen and halogen and in which the molar ratio of halogen:hydrogen (where hydrogen is present) is at least 1:1. The ratio of vinylidene fluoride units to units derived from the other olefin in the cotelomer chain is preferably at least 3:1. Typical cotelomers of vinylidene fluoride suitable in the invention are those in which vinylidene fluoride is cotelomerized with $CF_2=CFCl$, $CH_2=CFCl$, $CF_2=CCl_2$, $CF_2=CHCl$, $CF_3CF=CF_2$,

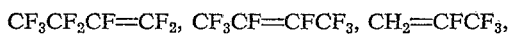

$CH_2=CClCF_3$, $CH_2=CFCF_2Cl$, $CH_2=CCl_2$, and the like.

A particularly useful class of starting materials for treatment in accordance with the invention are the vinylidene fluoride based homotelomers and cotelomers described in the aforementioned copending application Serial Nos. 773,551 and 776,432, particularly those which have melting temperatures slightly above normal temperatures, e.g. from 30 to 70° C. While heavy oils of good lubricant viscosity and of good viscosity-temperature characteristics may be prepared following the techniques described in the aforementioned applications, by further treating the products of these prior applications in accordance with the invention, it is possible to obtain liquid oils of even higher molecular weight and increased viscosity having improved viscosity-temperature characteristics. Thus, by treating telomers or cotelomers of these prior applications which melt slightly above normal temperatures to replace a minor proportion of the hydrogen atoms associated with the vinylidene fluoride units in the telomer chains with chlorine, these normally solid telomers may often be converted to normally liquid viscous oils of excellent viscosity-temperature characteristics.

The telomers that are advantageously treated in accordance with the invention are those containing from about 4 to 40 olefin units per molecule. In other words, in the homotelomers $A(CH_2CF_2)_nB$, the value of $n$ should be in the range from about 4 to about 40 and in the case of the cotelomers $A(Z)_m(CH_2CF_2)_nB$, the value of $n+m$ should be in that range. Telomers containing less than 4 olefin units per molecule are generally relatively light liquids at normal temperature and are not improved by chlorination of the chain hydrogens, while telomers having more than 40 olefin units per molecule are generally too high-melting to be converted into materials which are liquid at or close to normal temperatures. Preferably, the telomers treated in accordance with the invention are those having from 5 to 20 olefin units per molecule and the most advantageous application of the invention is with respect to telomers containing from about 5 to about 12 olefin units per molecule since telomers in this range of chain length often can be converted by treatment in accordance with the invention from solids melting somewhat above normal temperatures to viscous oils liquid at normal temperatures.

The chlorination of the vinylidene fluoride telomers to replace a minor proportion of the hydrogen atoms of the vinylidene fluoride units in the telomer chain should be carried out in such a manner that from 8 to 30 mole percent of the hydrogen atoms associated with vinylidene fluoride units in the telomer chain are replaced by chlorine. In most cases, it is preferred to replace from 10 to 25 mole percent of these hydrogen atoms with chlorine. Replacement of less than about 8% of the hydrogen atoms with the chlorine does not have a significant effect in bringing about the desired reduction in the melting temperature of telomers normally melting just below or somewhat above normal temperatures. If more than about 30% of the hydrogens are replaced by chlorine, the rate of change of viscosity with temperature is undesirably increased. Generally, when the mole percentage of hydrogen atoms associated with the vinylidene fluoride units in the telomer chain replaced by chlorine is between 10 and 25 mole percent, optimum results are obtained both with respect to the desired lowering of melting temperature to obtain viscous oils and with respect to the desired viscosity-temperature characteristics of the oils.

The replacement of hydrogen atoms of the vinylidene fluoride units in the telomer chain requires relatively vigorous chlorination conditions. One suitable procedure is to treat the telomer with elemental chlorine ($Cl_2$) at relatively high temperatures ranging from about 185° C. to 300° C. and preferably from 200° C. to 275° C. for relatively long contact times, for example, from 1–20 hours. Chlorination at lower temperatures, e.g. 150° C., for even long times, or chlorination at relatively high temperatures, e.g., 200° C. for relatively short times, will not effect appreciable replacement of the hydrogen atoms associated with the vinylidene fluoride ($CH_2CF_2$) units in the telomer chain. Thus, such hydrogen atoms are not replaced by chlorine under the relatively milder conditions that may be employed to replace, for example, a terminal iodine atom.

The use of ultra-violet light at normal temperatures generally will not produce the desired chlorination of the hydrogen atoms associated with vinylidene fluoride units in the chain although the use of ultra-violet light irradiation will in some cases permit the use of somewhat lower temperatures.

Where the hydrogen atoms of the vinylidene fluoride units are the only hydrogen atoms in the telomer, the course of the reaction can be conveniently followed by observing the evolution of hydrogen chloride which is the by-product of the substitution chlorination reaction. In such cases the extent of the chlorination can be determined by measuring the evolved HCl. The extent of the chlorination can, of course, also be followed by weight changes in the chlorinated product. In these or by other methods known to the art, the extent of the chlorination can be controlled.

When chlorinating a telomer terminating in a —$CH_2CF_2$ I group, such as telomers described in the aforementioned applications Serial Nos. 773,551 and 776,432, it is preferable first to replace the iodine atom by chlorine by use of a special technique which avoids the formation of unsaturated telomers. As explained in detail in the aforementioned applications, the formation of double bonds when chlorinating such iodides probably occurs through the loss of HI, producing a terminal —$CH=CF_2$ group, the loss of HI apparently being catalyzed by iodine chlorides, such as iodine monochloride, which are formed as a byproduct of the chlorination reaction. It has been found that this can be avoided by conducting the replacement of the iodine by chlorine in such manner that the iodine chlorides are kept in the vapor phase and swept out of contact with the telomers as they are formed. A suitable technique is to pass the liquid telomers in a large excess of gaseous chlorine, or a small excess of chlorine mixed with an inert gas, e.g., nitrogen, concurrently through a reaction zone, e.g., a packed column, maintained at a temperature of 160° C. to 200° C. where replacement of iodine by chlorine takes place. The large excess of gas sweeps out the iodine chloride vapor as it is formed and removes it from the reaction zone after only a very short contact with the liquid telomer iodides. The telomer chlorides are separately removed from the bottom of the column substantially free from iodine chlorides. The contact time required to replace the iodine atom with chlorine in such a reaction is very short, usually of the order of seconds and under these conditions no chlorination of the hydrogen atoms in the chain portion of the telomer takes place. After replacement of the iodine atom with chlorine, as described above, the telomer can be then chlorinated under more vigorous conditions to effect the desired replacement of a minor proportion of the hydrogen atoms of the vinylidene fluoride units in the chain with chlorine.

The chlorinated vinylidene fluoride telomers of the invention have an advantageous combination of properties. They are flame resistant and have good thermal and excellent chemical stability, in combination with desirable viscosity-volatility and viscosity-temperature properties. They are generally less volatile for a given viscosity then fluorinated oils now available. Their viscosity temperature properties (rate of change of viscosity with temperature) in some cases may approximate or even be superior to those displayed by hydrocarbon oils. The marked improvment in viscosity-temperature characteristics displayed by the telomers of the invention may be appreciated by comparing the ASTM viscosity slope of the telomers of the invention with other fluorinated telomer oils. The ASTM viscosity slope is the slope of the line expressing viscosity as a function of temperature plotted on an ASTM (D341–43) viscosity chart. The higher the value of the slope, the higher is the rate of change of viscosity with temperature. Highly fluorinated oils such as those based on the olefin perfluoropropene described and claimed in the copending application, Hauptschein, Braid and Lawlor Serial No. 701,995 of December 11, 1957, have ASTM slopes of the order of 1.3 to 1.4, while perfluorochloro telomer oils based on the olefin chlorotrifluoroethylene have ASTM slopes of the order of 1. The telomer oils of the invention, on the other hand, display ASTM slopes generally well below 1 and in many cases of the order of 0.6 to 0.7, these comparing favorably to the slopes normally displayed by conventional hydrocarbon lubricants.

This combination of properties makes the telomers of the invention particularly suitable for use as lubricants, hydraulic fluids, damping fluids, and for similar applications where relatively wide variations in temperature are involved, making the use of other types of fluorinated oils impossible or inconvenient.

The invention is illustrated by the following examples.

*Example 1*

A homotelomer of vinylidene fluoride is prepared by reacting $CH_2=CF_2$ with 1-chloro-2-iodohexafluoropropane $CF_3CF(CF_2Cl)I$ at a temperature of about 190° C. for about 24 hours under an initial pressure of 3500 p.s.i.g., as described in our co-pending application Serial No. 773,551. This reaction produces homotelomers of the formula $CF_3CF(CF_2Cl)[CH_2CF_2]_nI$. By fractional distillation, a fraction of such iodides is separated in which the average value of $n$ is about 8, this fraction being a solid melting slightly above normal temperature, viz. from 45° C. to 48° C. This telomer iodide is first chlorinated under relatively mild conditions to replace the iodine atom with chlorine. Following this relatively mild chlorination, the chlorinated telomer is distilled and 17 grams of telomer chloride $CF_3CF(CF_2Cl)[CH_2CF_2]_nCl$ melting about 50° C. where the average value of $n$ is approximately 7.5 is obtained having a boiling point 137°–224° C. (mainly 145–210°) at about 0.1 mm. Hg. The analysis of this chlorinated telomer is as follows: Calculated for $C_{18}H_{15}F_{21}Cl_2$: C, 30.8; H, 2.2; Cl, 10.1. Found: C, 30.1; H, 1.8; Cl, 9.4.

12.0 grams of this vinylidene fluoride homotelomer is chlorinated to replace a portion of the hydrogen atoms of the vinylidene fluoride units in the telomer chain with chlorine, the chlorination being conducted at 185° C. for 4.25 hours followed by an additional chlorination at 200° C. for four hours. The chlorination product is 12.4 grams of clear, almost colorless oil after purging with nitrogen. This product has a boiling range of 160–180° C. at less than 0.1 mm. Hg and a refractive index of $n_D^{28}$ 1.384. The analysis of this oil [Calculated for $C_{18}H_{13}F_{21}Cl_4$ C, 28.1; H, 1.57. Found: C, 28.4; H, 1.45] gives carbon and hydrogen analyses corresponding to the chlorinated telomer where an average of two hydrogens in each telomer molecule has been substituted by chlorine, which amounts to approximately 13 mole percent of the hydrogen atoms of the vinylidene fluoride units in the telomer chain.

This oil has the following viscosities at the temperature indicated: 1310 cs. (centistokes) at 77° F., 291 cs. at 111° F. and 24.4 cs. at 198° F. The ASTM viscosity slope of this oil (77–198° F.) is 0.657, this viscosity index being superior to that obtained with many hydrocarbon oils and greatly superior to that of commercially available fluorinated telomer oils.

In the foregoing example replacement of 13 mole percent of the hydrogen atoms of the vinylidene fluoride units in the telomer chain reduced the melting temperature of the starting telomers of he order of 40° C. providing a heavy oil of lubricant viscosity liquid at normal temperatures and having excellent viscosity-temperature properties.

*Example 2*

A cotelomer of vinylidene fluoride and chlorotrifluoroethylene is prepared by reacting $C_2Cl_2F_3I$, chlorotrifluoroethylene and vinylidene fluoride (molar ratio of $CF_2=CH_2:CF_2=CFCl:C_2Cl_2F_3I$ of 5:1:1) at a temperature of about 190° to 200° C. for 3½ hours at an initial pressure of 3900 p.s.i.g., as described in our copending application Serial No. 776,432. Cotelomer iodides of the formula $C_2Cl_2F_3(CF_2CFCl)_m(CH_2CF_2)_nI$ are obtained where the molar ratio of vinylidene fluoride to chlorotrifluoroethylene olefin units in the cotelomer chain is about 80:20.

A fraction of such cotelomers in which the average value of $n+m$ is equal to about 12, a solid melting somewhat above normal temperature, is chlorinated under relatively mild conditions to replace the terminal iodine with chlorine.

The cotelomer chlorides thus produced,

$C_2Cl_2CF_3(CF_2CFCl)_m(CH_2CF_2)_nCl$ where the average value of $n+m$ is about 12, are then further chlorinated at a temperature of approximately 250° C. for 2 hours. The replacement of the hydrogen atoms of the vinylidene fluoride units resulted in the evolution of HCl, approximately 20 mole percent of the hydrogen atoms being replaced by chlorine. The resultant chlorinated product is a viscous oil liquid at normal temperatures having an ASTM viscosity slope of the order of 0.7.

*Example 3*

A vinylidene fluoride homotelomer is prepared by reacting 71 grams of $CF_3I$ with 105 grams of $CH_2=CF_2$ (mole ratio $CH_2=CF_2:CF_3I$ of 4.53:1) in a 300 ml. Monel metal autoclave at 185° C. for 113 hours. The pressure drops from 2800 p.s.i.g. to 1050 p.s.i.g. during this period. A yield of 104.5 grams of solid telomer iodide of the formula $CF_3(CH_2CF_2)_nI$ is obtained having a melting range of 60–72° C. and in which the value of $n$ ranges from about 5 to 12.

A fraction of these telomer iodides in which the average value of $n$ is about 10, is separated by distillation under reduced pressure and then chlorinated under relatively mild conditions to replace the terminal iodine with chlorine. The resulting telomer chlorides, $CF_3(CH_2CF_2)_nCl$ where the average value of $n$ is about 10 melting about 75° C., are then chlorinated under more vigorous conditions (230° C. for 5 hours) resulting in the replacement of approximately 25 mole percent of the hydrogens with chlorine. The chlorinated product is a viscous oil, liquid at normal temperatures and having an ASTM viscosity slope of the order of 0.7.

This is a continuation-in-part of our copending application Serial No. 663,005, filed June 3, 1957, for "Fluorinated Organic Compounds," now abandoned.

We claim:
1. A product produced by the chlorination of vinylidene fluoride containing cotelomers the chain portion of which consists predominantly of vinylidene fluoride units, said cotelomers having the formula $A(Z)_m(CH_2CF_2)_nB$, where A is selected from the class consisting of halogen and halogenated alkyl radicals having from 1 to 6 carbon atoms; where B is halogen; where Z is an ethylenic divalent radical derived from a halogenated monoolefin having from 2 to 4 carbon atoms; and where $n$ and $m$ are integers, the value of $n+m$ being in the range of from 4 to 40; said cotelomers being prepared by chlorination under conditions effecting the replacement of hydrogen atoms associated with said vinylidene fluoride units with chlorine, said chlorination being continued for a period of time sufficient to replace from 8 to 30 mole percent of said hydrogen atoms with chlorine.

2. A product produced by the chlorination of vinylidene fluoride containing cotelomers the chain portion of which consists predominantly of vinylidene fluoride units, said cotelomers having the formula $A(Z)_m(CH_2CF_2)_nB$ where A is selected from the class consisting of halogen and halogenated alkyl radicals having from 1 to 6 carbon atoms; where B is halogen; where Z is an ethylenic divalent radical derived from a halogenated monoolefin having from 2 to 4 carbon atoms; where $n$ and $m$ are integers, the value of $n+m$ being in the range of from 5 to 20; said cotelomers being prepared by chlorination under conditions effecting the replacement of hydrogen atoms associated with said vinylidene fluoride units with chlorine, said chlorination being continued for a period of time sufficient to replace from 10 to 25 mole percent of said hydrogen atoms with chlorine.

References Cited in the file of this patent

UNITED STATES PATENTS

| | | |
|---|---|---|
| 2,778,375 | Ehrenfeld | Apr. 9, 1957 |
| 2,856,439 | Frey | Oct. 14, 1958 |
| 2,875,253 | Barnhart | Feb. 14, 1959 |
| 2,898,382 | Barnhart | Aug. 4, 1959 |